July 7, 1925.

F. F. DICK 1,545,311

GRAIN MEASURING DEVICE

Filed June 20, 1924     4 Sheets-Sheet 1

INVENTOR
F. F. Dick
BY Victor J. Evans
ATTORNEY

WITNESS:

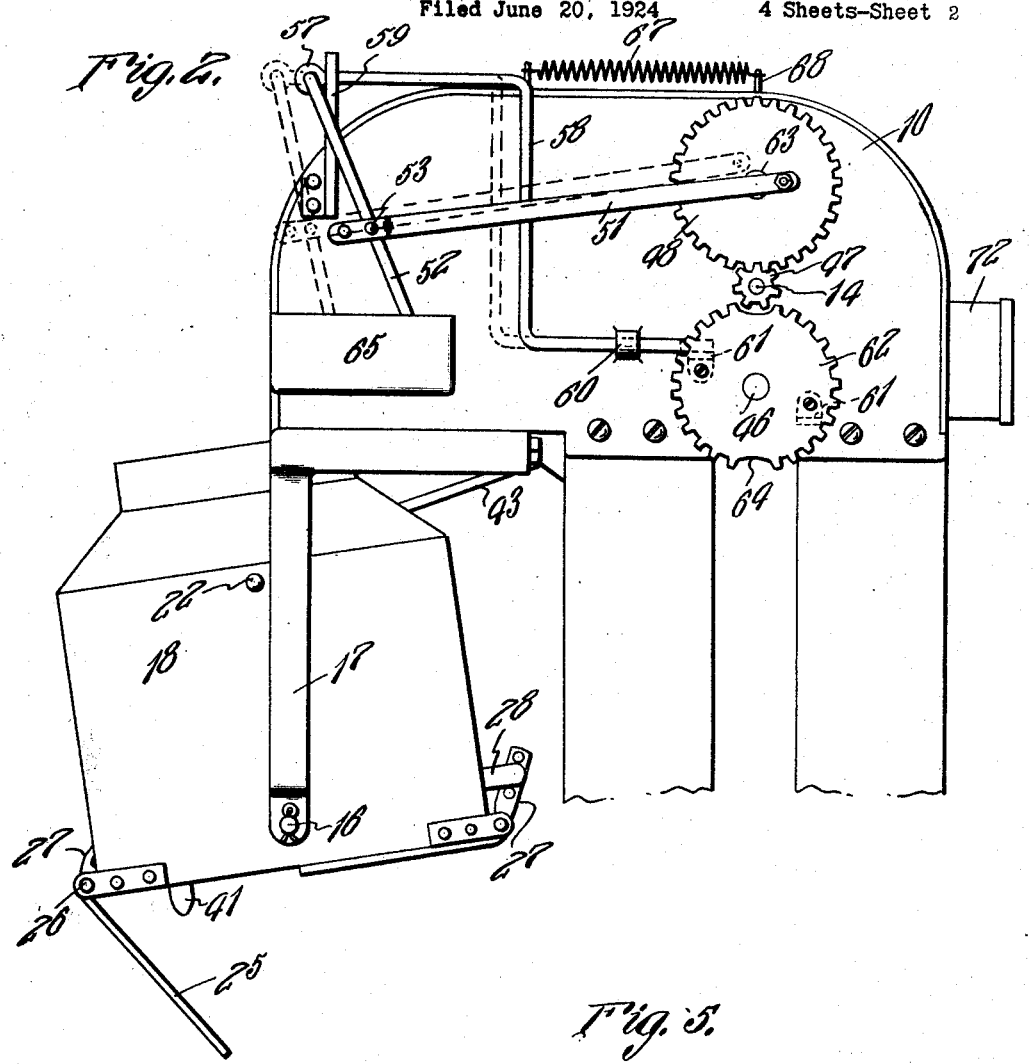

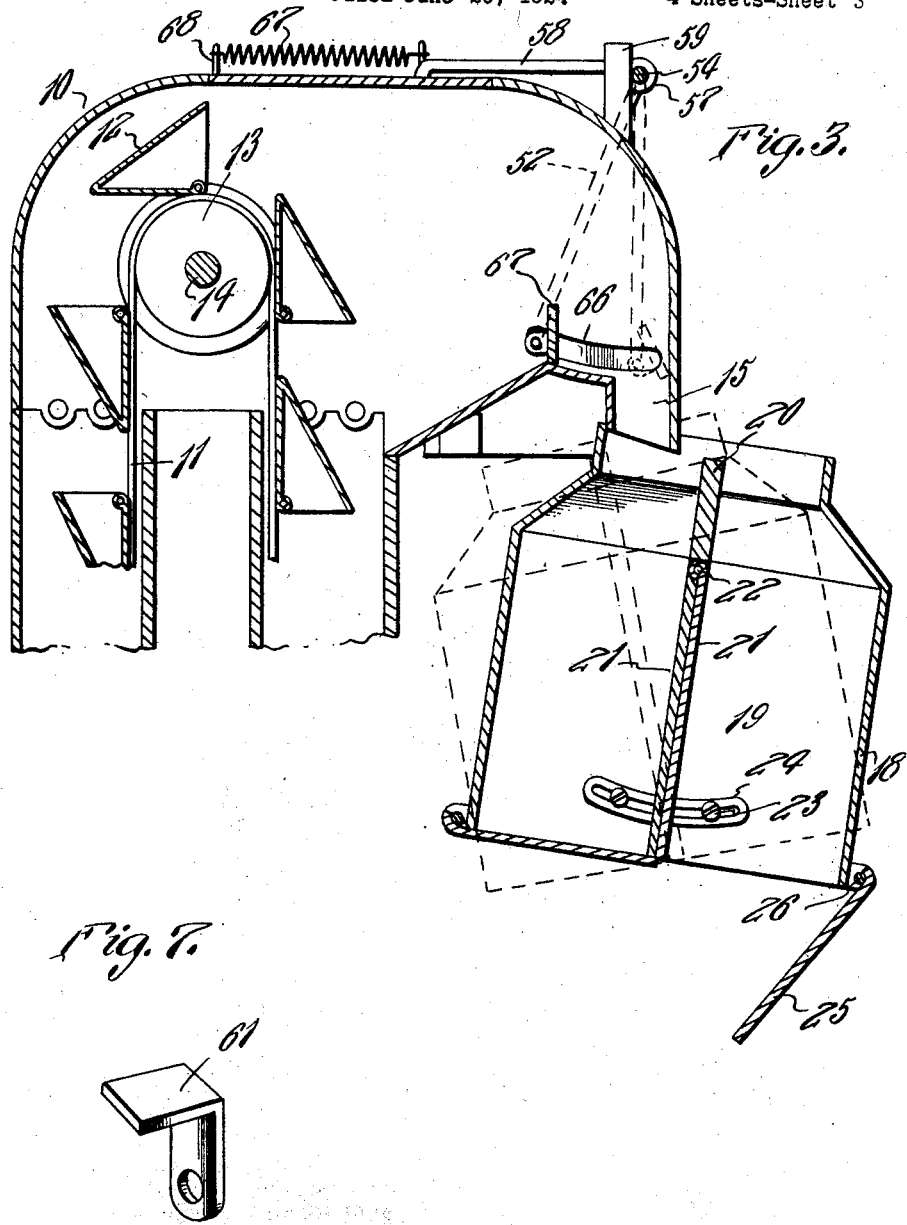

July 7, 1925.
F. F. DICK
1,545,311
GRAIN MEASURING DEVICE
Filed June 20, 1924   4 Sheets-Sheet 4
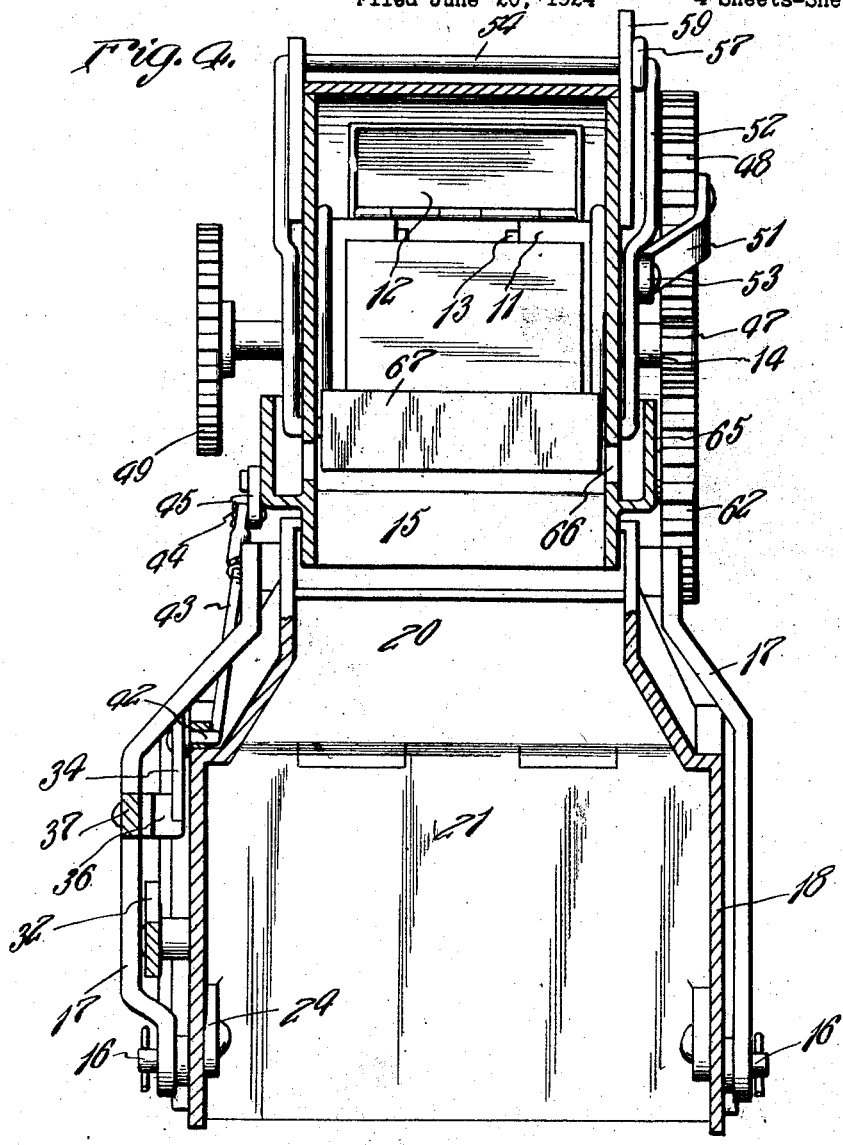

Patented July 7, 1925.

1,545,311

UNITED STATES PATENT OFFICE.

FRANK F. DICK, OF HENDERSON, NEBRASKA.

GRAIN-MEASURING DEVICE.

Application filed June 20, 1924. Serial No. 721,301.

*To all whom it may concern:*

Be it known that I, FRANK F. DICK, a citizen of the United States, residing at Henderson, in the county of York and State of Nebraska, have invented new and useful Improvements in Grain-Measuring Devices, of which the following is a specification.

This invention relates to improvements in measuring devices especially adapted for use in connection with threshing machines for the purpose of measuring grain.

An object of the present invention is the provision of means for measuring the threshed grain so that the amount will not vary irrespective of the condition of the grain, means being provided whereby the measure may be adjusted to regulate its capacity.

Another object of the invention is the provision of means which may be attached to the threshing machine and operated and controlled by the mechanism of the latter to continually measure the grain as it is being threshed.

Another object of the invention is the provision of means for automatically elevating the grain within the filled measure so that the amount will be the same at each operation.

Another object of the invention is the provision of a measuring device which includes a plurality of measures or compartments which are alternately filled and dumped, automatically operated means being provided for releasing the contents of a filled measure or compartment and closing the other measure or compartment for filling.

With the above and other objects in view, the invention further includes the following novel features and details of construction, to be hereinafter more fully described, illustrated in the accompanying drawings and pointed out in the appended claims.

In the drawings:—

Figure 2 is a similar view looking at the side opposite that shown in Figure 1.

Figure 3 is a vertical sectional view of the same.

Figure 4 is a vertical sectional view at right angles to Figure 3, the section being taken substantially on the line 4—4 of Figure 1.

Figure 5 is an enlarged horizontal sectional view taken substantially on the line 5—5 of Figure 1.

Figure 7 is a detail perspective view of one of the stop lugs.

Figure 1:
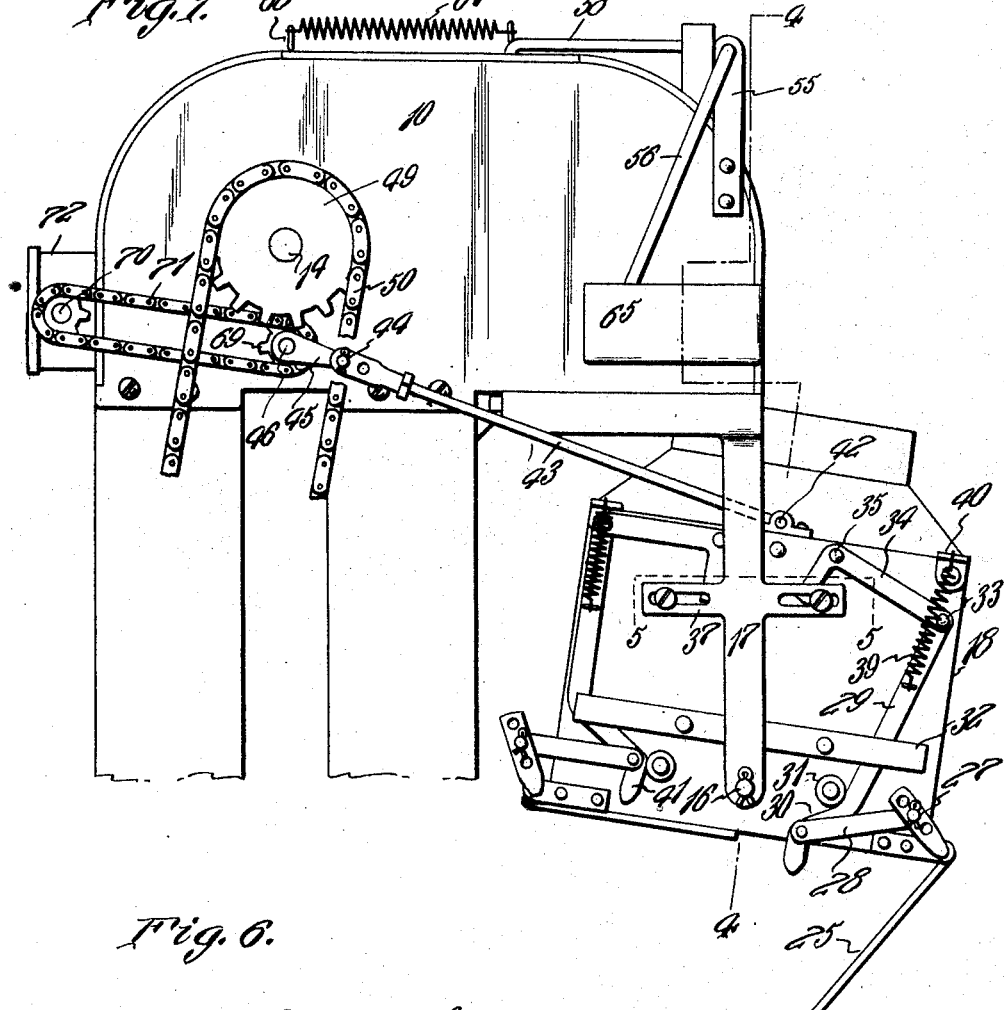
Figure 1 is a fragmentary side elevation showing a portion of the conveyor housing of a threshing machine with the invention applied.
Figure 6:
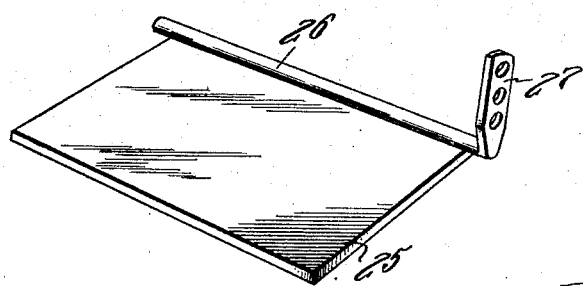
Figure 6 is a detail perspective view of one of the pivoted bottoms of the measuring compartments.

Referring to the drawings in detail wherein like characters of reference denote corresponding parts, the reference character 10 indicates a portion of the housing of a threshing machine conveyor. This conveyor may be of the usual or any desired type and is shown as comprising an endless belt 11 which carries a plurality of buckets 12. The belt passes over a pulley 13 which is mounted upon a shaft 14 extending transversely through the upper end of the housing 10 and arranged so that the buckets 12 will discharge the grain laterally for passage through a downwardly extending chute 15.

Pivotally mounted as indicated at 16 between the lower ends of hanger brackets or arms 17 is a bin or container 18. This bin or container is open at the top and is positioned for horizontal swinging movement beneath the chute 15. The bin is further divided into separate measuring compartments 19 by means of a partition 20. This partition is of novel construction and includes an upper stationary section and a lower movable section. This last mentioned section comprises a pair of relatively movable panels 21 which are pivotally mounted as shown at 22 and which may be adjusted laterally to regulate the capacity of each measuring compartment. The panels 21 are held in adjusted position by means of set screws 23 which are carried by the bin or container 18 and which passes through slotted arcuate arms 24 secured to each of the panels 21. The bottom of each measuring compartment 19 is formed by a gate or closure 25 which is pivotally mounted as shown at 26 and which provides a dump bottom. The bottoms 25 of the compartments 19 are alternately opened and closed through the pivotal movement of the container 18 and for the purpose of controlling these bottoms they are each provided with a crank arm 27 which is rigid therewith.

These crank arms have an adjustable pivotal connection with links 28 and the latter are in turn pivotally connected to one end of a cam lever 29. The levers 29 are provided near their lower ends with inclined cam edges 30 which engage rollers 31 carried by the container 18. The levers 29 are movable behind guides 32 and are pivotally connected as shown at 33 with the outer ends of bell crank levers 34. The levers 34 are pivotally mounted upon the container 18 as shown at 35 and have their opposite or inner ends adapted for engagement by keeper lugs 36 which are horizontally adjustable along oppositely extending arms 37 which project from the brackets 17. The lugs 36 are held in adjusted position by means of set screws 38 which pass through slots provided in the arms 37 and which engage the lugs 36. The cam levers 29 have connected thereto the lower ends of coiled springs 39 while the opposite ends of these springs are connected to lugs 40 which are secured to the container 18.

When the container 18 is rocked upon the pivot 16 in a manner to be hereinafter explained, it will be seen by reference to Figure 1 that a rocking movement of the container to the right of said figure will release and open the dump bottom 25 of the right hand measuring compartment 19, while the bottom of the other measuring compartment will be closed and locked in closed position. When the container is rocked in an opposite direction, the cam edge 30 of the lever 29 at the right of said Figure 1 will engage the roller 31 so as to force the link 28 outward and close the door 25, the spring 39 acting to move the cam lever 29 upward to the position occupied by the cam lever 29 at the left of the said figure. This will cause an extension 41 at the lower extremity of the levers 29 to engage the roller 31 so that the bottom 25 will be securely held in closed position, the spring 39 acting to effect a quick closing of the bottom. At the same time pivotal movement of the container 18 to the left will cause the inner end of the bell crank lever 34 at the left of said figure to engage its particular lug 36 and the latter will act to move the bell crank lever 34 upon its pivot 35 and force the cam lever 29 downward so as to open the bottom of the left hand measuring compartment.

Pivotally secured to the container 18 as shown at 42 is one end of a shifter rod 43. The opposite end of this rod is pivotally connected as shown at 44 to the outer end of a crank arm 45 which is secured upon one end of a shaft 46 extending transversely through the housing 10. One end of the shaft 14 has secured thereon a pinion 47 which engages and drives a gear 48, the latter being secured upon a stub shaft 63.

Secured upon the opposite end of the shaft 14 is a sprocket 49 over which passes a drive chain 50, the latter receiving power from any suitable source which may be the usual conveyor operating mechanism.

Eccentrically secured to the gear 48 is one end of a connecting bar 51 whose opposite end is secured to one arm 52 of a yoke, the securing means being indicated at 53. This yoke includes a horizontal portion 54 which extends transversely across the top of the conveyor housing and has one of its ends mounted in a bearing arm 55 secured to said housing. The other arm 56 of the yoke extends downwardly along the side of the housing opposite the arm 52. The end of the horizontal portion 54 of the yoke to which the arm 52 is connected is mounted in a movable bearing 57 which is carried at the outer end of a substantially Z-shaped member 58. One end of this member is slidingly mounted in a bearing arm 59 secured to the housing 10 while the opposite end of the arm 58 is slidingly mounted in a bearing 60 also carried by the housing 10. This end of the member 58 provides a stop arm which is located in the path of a pair of diametrically opposite lugs 61 which are secured to the rear face of a gear 62. This gear is mounted upon one end of the shaft 46 which extends from the housing 10 and is provided with diametrically opposite interrupted portions 64 in its toothed face so that it may be alternately engaged and disengaged by the pinion 47.

The arms 52 and 56 extend downwardly within pockets 65 provided upon opposite sides of the housing 10 and through arcuate slots 66 provided in said housing and are connected by a plate 67 which provides a jamb plate as will be hereinafter apparent.

The Z-shaped member 58 has connected thereto one end of a spring 67 and the opposite end of this spring is connected to the housing as shown at 68 so that the member 58 is normally retracted to hold its inner end in the path of the stop lug 61.

The shaft 46 has mounted thereon a sprocket 69 which is connected to a sprocket 70 by means of a chain 71. This sprocket 70 is adapted to operate a counter or tally mechanism of any desired type which is located within a casing 72 carried by the housing 10.

Assuming that the container or bin 18 is in the position shown in the drawings and the bottoms 25 have been operated in the manner previously described to close the left hand compartment and open the right hand compartment in Figure 3 of the drawings, the grain discharged from the buckets 12 will through centrifugal force be directed outward through the chute 15 into the left hand compartment 19. As the compartment is being filled, the jamb plate 67 will move alternately backward and forward across the chute due to the connection of its yoke with the gear 48. The pinion 47 drives the gear 48, but by reference to Figure 2 of the drawings it will be seen that this pinion occupies one of the interrupted portions of the gear 62 so that no motion is imparted to this last mentioned gear and the latter is held stationary by the inner end of the Z-shaped member 58. As soon as the left hand measuring compartment 19 has been filled with the grain, the latter piling up within the chute 15 will occupy the space between the jamb plate and the adjacent wall of the housing so that the said plate will jamb and thus be held against movement. This will cause the arm 52 of the yoke to which the jamb plate is connected to move outward at its upper end under the pressure of the connecting bar 51 so that the fulcrum point of the upper end of the arm 52 of the yoke is changed substantially to the position shown by the dotted lines in Figure 2. The Z-shaped member 58 is thus moved outward so that the inner end of the said member is moved out of the path of the stop lug 61. At this juncture, the spring 39 of the cam lever 29 at the right of Figure 1 of the drawings will draw this lever 39 upward so that the inner end of the bell crank lever 34 will be forced against its lug 36 and as the pivotal connection 44 between the shifter rod 43 and the crank arm 45 is slightly off center, sufficient movement will be imparted to the shaft 46 to bring the teeth of the gear 62 into mesh with the pinion 47 so that the gear 62 will be rotated one-half revolution or until the opposite interrupted portion of the teeth will cause the disengagement of the gear 62 and the pinion 47. At this point the opposite stop 61 will engage the inner end of the member 58 which has been previously moved into the path of the stop through the inward movement of the yoke under the action of the connecting bar 51 and the spring 67.

The invention is susceptible of various changes in its form, proportions and minor details of construction and the right is herein reserved to make such changes as properly fall within the scope of the appended claims.

Having described the invention what is claimed is:—

1. The combination with a conveyor having a discharge chute, of a grain measuring device comprising a normally stationary container open at the top and located beneath the chute, a partition dividing the container into separate measuring compartments, means for pivotally mounting the container, a shifter rod connected to the container, means for operating the shifter rod to rock the container pivotally, means for holding the shifter rod operating means inactive, a horizontally movable element located in the path of grain passing through the chute and controlled by said grain, whereby when one measuring compartment is full, operation of the horizontally movable element will be stopped and means rendered active when the movable element is inactive to automatically release the shifter rod holding means and render said rod operating means inactive to position the other compartment beneath the chute.

2. The combination with a conveyor having a discharge chute, of a grain measuring device comprising a normally stationary container open at the top and located beneath the chute, a partition dividing the container into separate measuring compartments, means for pivotally mounting the container, a shifter rod connected to the container, means for operating the shifter rod to rock the container pivotally, means for holding the shifter rod operating means inactive pivotally mounted horizontally movable means located in the path of grain passing through the chute and controlled by said grain, whereby when one measuring compartment is full operation of said pivotally mounted horizontally movable means will be stopped and means rendered active when said pivotally mounted horizontally movable means is inactive to automatically release the shifter rod holding means and render said rod operating means active to position an empty compartment beneath the chute.

3. The combination with a conveyor having a discharge chute, of a grain measuring device comprising a pivotally mounted container open at the top and located beneath the chute and divided into separate measuring compartments, means whereby the container may be automatically moved when one of the compartments is filled to bring the other compartment into position for filling, a pivotally mounted dump bottom for each compartment, a spring actuated pivotally mounted cam lever for each dump bottom, means connecting the cam levers and dump bottoms, rollers engaged by the cam levers to close one of the bottoms and open the other bottom when the container is moved in one direction and means whereby the cam lever will lock the closed bottom against accidental opening.

4. The combination with a conveyor having a discharge chute, of a grain measuring device comprising a pivotally mounted container open at the top and located beneath the chute and divided into separate measuring compartments, means whereby the container may be automatically moved when one of the compartments is filled to bring the other compartment into position for filling, a pivotally mounted dump bottom for each compartment, a spring actuated pivotally mounted cam lever for each dump bottom, means connecting the cam levers and dump bottoms, rollers engaged by the cam levers to close one of the bottoms and open the other bottom when the container is moved in one direction, means whereby the cam lever will lock the closed bottom against accidental opening and means whereby the bottom closing means will control the initial operation of the container moving means.

5. The combination with a conveyor having a discharge chute, of a grain measuring device comprising a pivotally mounted container open at the top and located beneath the chute, a partition dividing the container into separate measuring compartments, means whereby the partition may be adjusted to regulate the capacity of said compartments, normally inactive means for moving the container to alternately position the discharge chute over each of the measuring compartments and means controlled by the passage of grain through the discharge chute when one measuring compartment is full to render the container moving means active and position the other compartment beneath the chute.

6. The combination with a conveyor having a discharge chute, of a grain measuring device comprising a normally stationary container open at the top, means supporting the container for horizontal movement beneath the chute, a partition dividing the container into separate measuring compartments, each of the measuring compartments having a discharge opening, normally inactive means for moving the container to alternately position the measuring compartments beneath the discharge chute, a door for the discharge opening of each measuring compartment, means controlled by the position of the chute for controlling the doors and means controlled by the door controlling means for rendering the container moving means active.

7. The combination with a conveyor having a discharge chute and means for operating the conveyor, of a grain measuring device comprising a normally stationary container open at the top, means supporting the container for horizontal movement beneath the chute, a partition dividing the container into separate measuring compartments, each of the measuring compartments having a discharge opening, normally inactive means for moving the container to alternately position the measuring compartments beneath the discharge chute, a door for the discharge opening of each measuring compartment, means controlled by the position of the chute for controlling the doors and means controlled by the door controlling means for operatively connecting the container moving means and the conveyor moving means when one measuring compartment is full to position the other measuring compartment beneath the chute.

In testimony whereof I affix my signature.

FRANK F. DICK.